(12) United States Patent
Saste et al.

(10) Patent No.: US 11,663,659 B2
(45) Date of Patent: May 30, 2023

(54) METHODS FOR EARLY CREDIT RISK ESCALATION AND MANAGEMENT AND DEVICES THEREOF

(71) Applicant: JPMorgan Chase Bank, N.A., New York, NY (US)

(72) Inventors: Satyajit Balkrishna Saste, Hillsboro, OR (US); Ashwin Sangtani, West New York, NY (US); Mark T. Dibattista, Jackson Heights, NY (US); Benjamin F. Sylvester, III, Darien, CT (US); James Glynn, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 401 days.

(21) Appl. No.: 16/434,588

(22) Filed: Jun. 7, 2019

(65) Prior Publication Data

US 2019/0378209 A1 Dec. 12, 2019

Related U.S. Application Data

(60) Provisional application No. 62/682,423, filed on Jun. 8, 2018.

(51) Int. Cl.
*G06Q 40/00* (2023.01)
*G06Q 40/03* (2023.01)
(Continued)

(52) U.S. Cl.
CPC ............. *G06Q 40/03* (2023.01); *G06F 17/18* (2013.01); *G06N 20/00* (2019.01)

(58) Field of Classification Search
CPC ...... G06Q 40/00; G06Q 40/025; G06N 20/00; G06F 17/18
See application file for complete search history.

(56) References Cited

U.S. PATENT DOCUMENTS 9,990,587 B2 6/2018 Okanohara et al.
10,007,914 B2 * 6/2018 Cama .................. G06Q 20/405
(Continued)

FOREIGN PATENT DOCUMENTS

CN 107169864 A * 9/2017

OTHER PUBLICATIONS

New frontier in borrowing; Cellphones, big data link lenders to the world Yoon, Sangwon. National Post; Don Mills, Ont. [Don Mills, Ont]Nov. 17, 2015: FP.8. (Year: 2015).*
(Continued)

*Primary Examiner* — Lalita M Hamilton
(74) *Attorney, Agent, or Firm* — Greenblum & Bernstein, P.L.C.

(57) ABSTRACT

Systems and methods for assessing a credit exposure risk are provided. The methods include collecting credit facility data from at least one credit lender server device; determining, based on the credit facility data, at least one feature vector that is associated with at least one credit borrower device; applying at least one escalation rule to the feature vector; determining whether the at least one feature vector satisfies the applied escalation rule; and when the at least one feature vector is determined as not satisfying the applied escalation rule, performing an escalation action with respect to an entity associated with the credit borrower device.

14 Claims, 5 Drawing Sheets

(51) Int. Cl.
*G06F 17/18* (2006.01)
*G06N 20/00* (2019.01)

(56) References Cited

U.S. PATENT DOCUMENTS

| | | | |
|---|---|---|---|
| 10,475,029 B2* | 11/2019 | Acuna-Rohter | ... G06Q 20/4016 |
| 2007/0094181 A1 | 4/2007 | Tayebnejad et al. | |
| 2013/0290167 A1 | 10/2013 | Laky et al. | |
| 2014/0074688 A1* | 3/2014 | Shvarts | ............... G06Q 30/02 |
| | | | 705/38 |
| 2014/0365353 A1* | 12/2014 | Shvarts | ............ G06Q 40/025 |
| | | | 705/38 |
| 2014/0365354 A1* | 12/2014 | Shvarts | ............... G06Q 30/02 |
| | | | 705/38 |
| 2017/0228820 A1 | 8/2017 | Rohn et al. | |
| 2018/0047111 A1 | 2/2018 | Vieira et al. | |
| 2019/0114643 A1* | 4/2019 | Dewitt | ............ G06Q 20/384 |

OTHER PUBLICATIONS

Machine Learning Model for Credit Card Fraud Detection—A Comparative Analysis P Sharma, S Banerjee, D Tiwari, JC Patni—The International Arab Journal of . . . , 2021—iajit.org (Year: 2021).*

Financial Instability, Uncertainty and Banks' Lending Behaviour V Swamy—Uncertainty and Banks' Lending Behaviour (Aug 8 . . . , 2012—papers.ssm.com (Year: 2012).*

International Search Report for corresponding International Application No. PCT/US19/36083, dated Aug. 30, 2019.

* cited by examiner

METHODS FOR EARLY CREDIT RISK ESCALATION AND MANAGEMENT AND DEVICES THEREOF

CROSS-REFERENCE TO RELATED APPLICATIONS

This application claims the benefit of U.S. Provisional Patent Application Ser. No. 62/682,423, filed Jun. 8, 2018, which is hereby incorporated by reference in its entirety.

BACKGROUND

1. Field of the Disclosure

This technology generally relates to methods and systems for detecting and managing credit risk, and more particularly to methods and systems for monitoring intraday credit exposure and usage in near real time.

2. Background Information

Many individuals and commercial entities obtain credit from financial institutions, such as banks, and make use of the available credit as needed or desired in order to conduct business and perform everyday activities. In this regard, for a particular line of credit, a credit lender must assess whether an amount of risk with respect to a credit borrower is deemed acceptable.

In the current market environment, such an assessment may change quickly, depending on various market conditions and other economic indicators. As a result, even when an amount of risk for a particular line of credit is deemed acceptable at the beginning of a business day, it is possible that this assessment may change as a result of activities that occur during that business day. In such a circumstance, if an updated assessment is not made quickly, then the lender incurs a relatively high risk of default by the credit borrower.

Therefore, in view of the above, there is a need for a capability to monitor near-real-time credit exposures and to assess credit risk based on intraday credit usage alerting analytics in an efficient and uniform manner.

SUMMARY

The present disclosure, through one or more of its various aspects, embodiments, and/or specific features or sub-components, provides, inter alia, various systems, servers, devices, methods, media, programs, and platforms for assessing credit risk based on intraday credit usage analytics. The various aspects, embodiments, features, and/or sub-components provide optimized processes of monitoring near-real-time credit exposures based on intraday credit usage analytics.

According to an aspect of the present disclosure, a method for assessing a credit exposure risk is provided. The method is implemented by a processor on a computing device. The method includes: collecting credit facility data from at least one credit lender server device; determining, based on the credit facility data, at least one feature vector that is associated with at least one credit borrower device; applying at least one escalation rule to the at least one feature vector; determining whether the at least one feature vector satisfies the applied at least one escalation rule; and when the at least one feature vector is determined as not satisfying the applied at least one escalation rule, performing an escalation action with respect to an entity associated with the at least one credit borrower device.

The at least one feature vector may include at least one of a credit exposure maximum scaled vector, a credit size vector, a count credit occurrences vector, a credit last usage vector, a credit exposure vector, a credit usage vector, a maximum usage vector, a credit exposure scaled vector, a count of usage vector, a change from last usage vector, a change from start-of-day (SOD) usage vector, a current usage vector, a peak usage vector, an end-of-day (EOD) usage vector, a limit size vector, a peak line utilization vector, and a current line utilization vector.

The escalation action may include at least one of suspending a financial account associated with the credit borrower device, sending a notification to the credit borrower device, and providing a recommendation to reduce a credit line associated with the credit borrower device.

The credit facility data may include at least one of credit overage data associated with the credit borrower device, financial loan data associated with the credit borrower device, data that relates to at least one financial transaction performed by the credit borrower device, and financial account data associated with the credit borrower device.

The determining whether the at least one feature vector satisfies the applied at least one escalation rule may include monitoring the determined at least one feature vector for a predetermined time period.

The monitoring may be performed continuously. Alternatively, the monitoring may be performed periodically at a regular interval within the predetermined time period.

The method may further include updating a learning algorithm based on a result of the monitoring. The learning algorithm may include a linear logistics regression model learning algorithm that is stored in a memory of the computing device.

The method may further include displaying, on a display of the computing device, a result of the determining whether the at least one feature vector satisfies the applied at least one escalation rule.

According to another aspect of the present disclosure, a computing device configured to implement an execution of a method for assessing a credit exposure risk is provided. The computing device includes a display screen, a processor, a memory, and a communication interface coupled to each of the processor, the memory, and the display screen. The processor is configured to: collect credit facility data from at least one credit lender server device; determine, based on the credit facility data, at least one feature vector that is associated with at least one credit borrower device; apply at least one escalation rule to the at least one feature vector; determine whether the at least one feature vector satisfies the applied at least one escalation rule; and when the at least one feature vector is determined as not satisfying the applied at least one escalation rule, perform an escalation action with respect to an entity associated with the at least one credit borrower device.

The at least one feature vector may include at least one of a credit exposure maximum scaled vector, a credit size vector, a count credit occurrences vector, a credit last usage vector, a credit exposure vector, a credit usage vector, a maximum usage vector, a credit exposure scaled vector, a count of usage vector, a change from last usage vector, a change from start-of-day (SOD) usage vector, a current usage vector, a peak usage vector, an end-of-day (EOD) usage vector, a limit size vector, a peak line utilization vector, and a current line utilization vector.

The escalation action may include at least one of suspending a financial account associated with the credit borrower device, sending a notification to the credit borrower device, and providing a recommendation to reduce a credit line associated with the credit borrower device.

The credit facility data may include at least one of credit overage data associated with the credit borrower device, financial loan data associated with the credit borrower device, data that relates to at least one financial transaction performed by the credit borrower device, and financial account data associated with the credit borrower device.

The processor may be further configured to determine whether the at least one feature vector satisfies the applied at least one escalation rule by monitoring the determined at least one feature vector for a predetermined time period.

The monitoring may be performed continuously. Alternatively, the monitoring may performed periodically at a regular interval within the predetermined time period.

The processor may be further configured to update a learning algorithm based on a result of the monitoring. The learning algorithm may include a linear logistics regression model learning algorithm that is stored in the memory.

The processor may be further configured to display, on the display screen, a result of the determination whether the at least one feature vector satisfies the applied at least one escalation rule.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
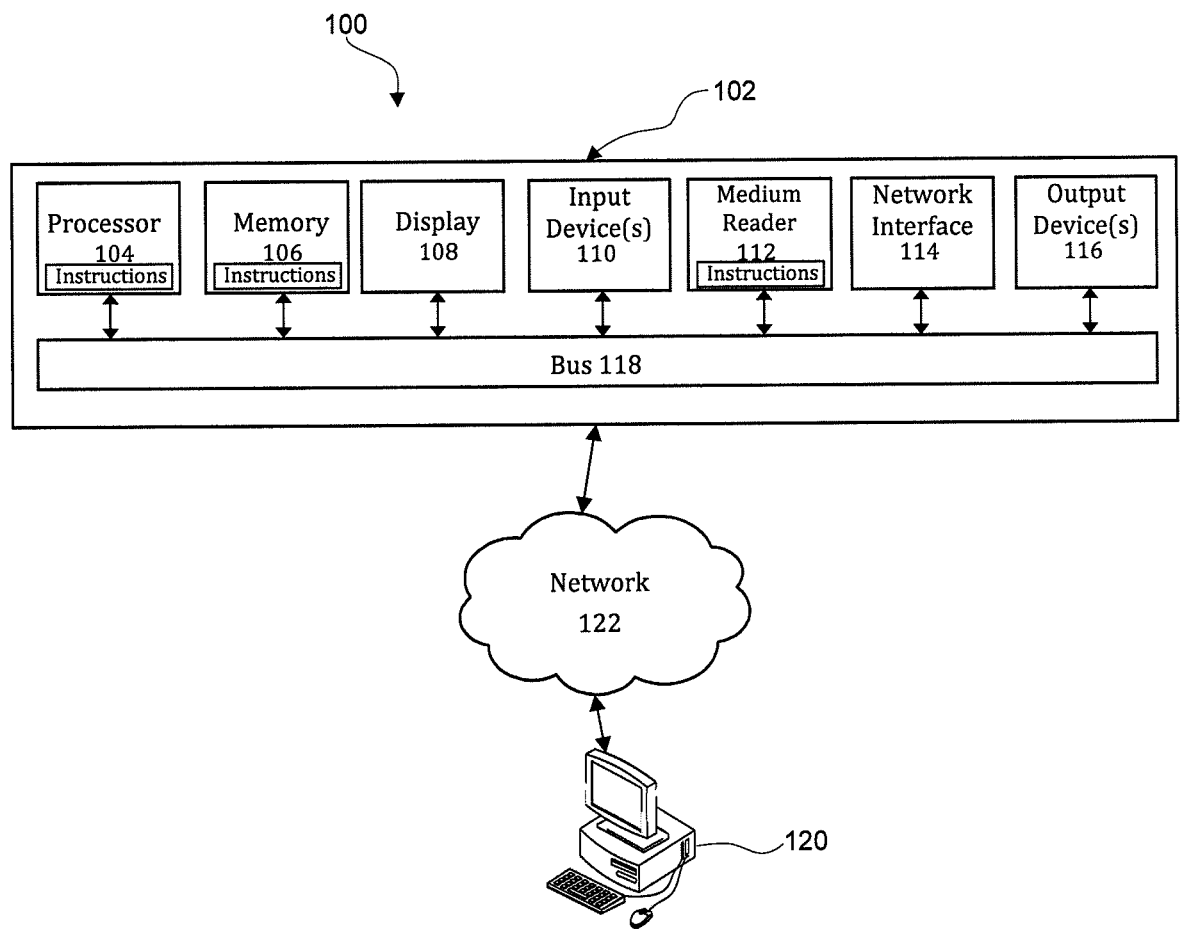
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a client-server user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of monitoring credit exposure and assessing credit risk.

Figure 2:
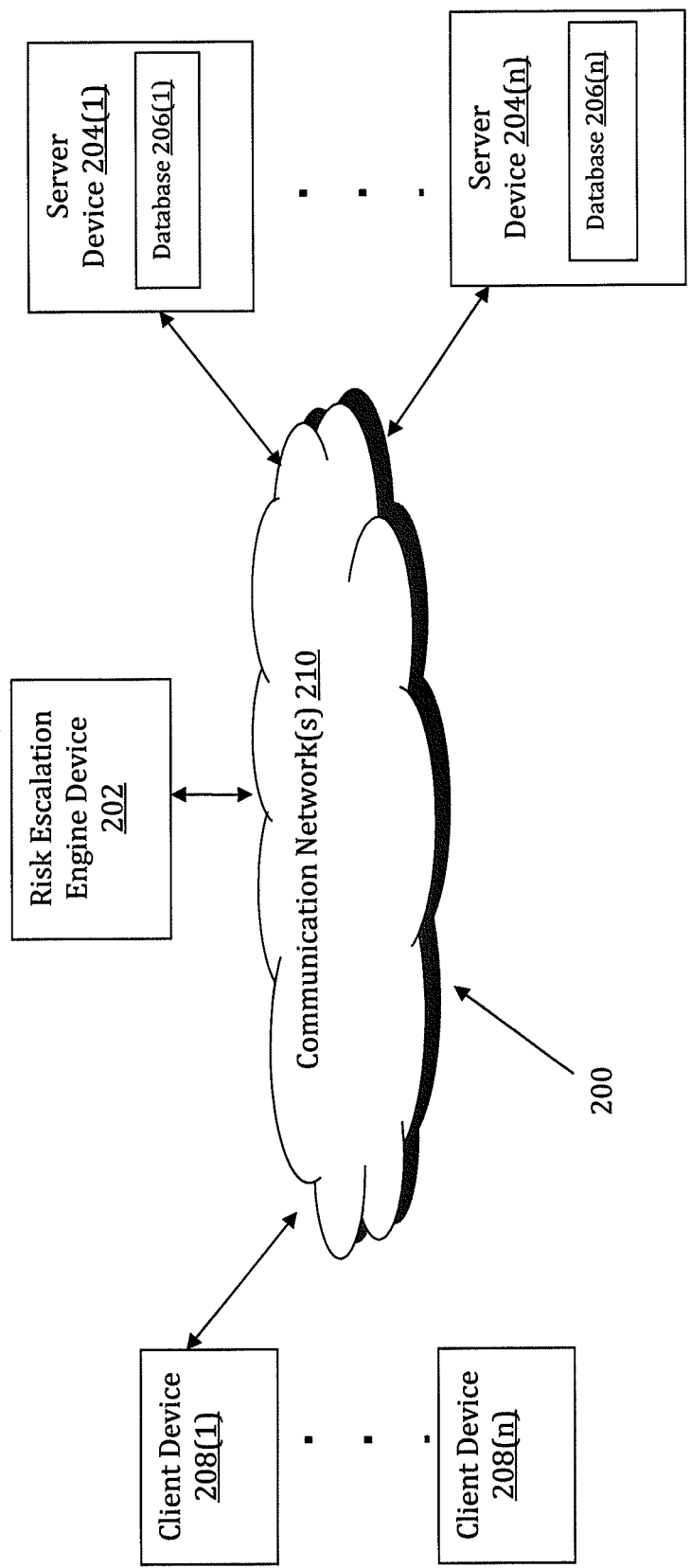
FIG. 2 illustrates an exemplary diagram of a network environment.

Referring to FIG. 2, a schematic of an exemplary network environment 200 for implementing a method for monitoring credit exposure and assessing credit risk is illustrated. In an exemplary embodiment, the method is executable on any networked computer platform, such as, for example, a wireless mobile communication device, i.e., a smart phone.

The method for monitoring credit exposure and assessing credit risk may be implemented by a Risk Escalation Engine (REE) device 202. The REE device 202 may be the same or similar to the computer system 102 as described with respect to FIG. 1. The REE device 202 may store one or more applications that can include executable instructions that, when executed by the REE device 202, cause the REE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the REE device 202 itself, may be located in virtual server(s) running in a cloud-based computing environment rather than being tied to one or more specific physical network computing devices. Also, the application(s) may be running in one or more virtual machines (VMs) executing on the REE device 202. Additionally, in one or more embodiments of this technology, virtual machine(s) running on the REE device 202 may be managed or supervised by a hypervisor.

In the network environment 200 of FIG. 2, the REE device 202 is coupled to a plurality of server devices 204(1)-204(n) that hosts a plurality of databases 206(1)-206(n), and also to a plurality of client devices 208(1)-208(n) via communication network(s) 210. A communication interface of the REE device 202, such as the network interface 114 of the computer system 102 of FIG. 1, operatively couples and communicates between the REE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the REE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and REE devices that efficiently monitor credit exposure and assess credit risk in a near-real-time mode.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The REE device 202 may be a standalone device or integrated with one or more other devices or apparatuses, such as one or more of the server devices 204(1)-204(n), for example. In one particular example, the REE device 202 may include or be hosted by one of the server devices 204(1)-204(n), and other arrangements are also possible. Moreover, one or more of the devices of the REE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the REE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store credit facility data, borrower requirements and borrower data, escalation rules and analytics data, and any other data that relates to credit risk monitoring and assessment.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a primary/secondary approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), and/or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the REE device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the REE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the REE device 202, the server devices 204(1)-204(n), or the client devices 208(1)-208(n), for example, may be configured to operate as virtual instances on the same physical machine. In other words, one or more of the REE device 202, the server devices 204(1)-204(n), or the client devices 208(1)-208(n) may operate on the same physical device rather than as separate devices communicating through communication network(s) 210. Additionally, there may be more or fewer REE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
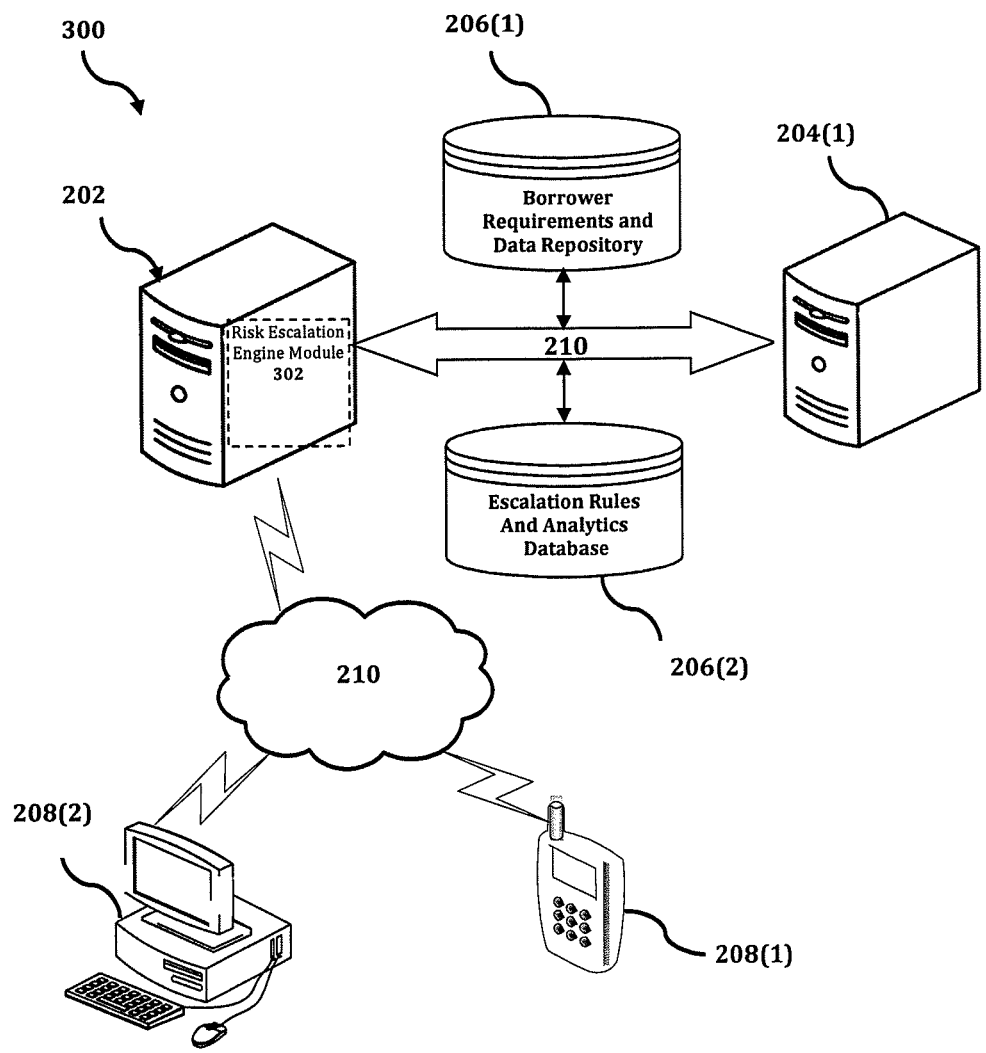
FIG. 3 shows an exemplary system for monitoring credit exposure and assessing credit risk.

The REE device 202 is described and shown in FIG. 3 as including a risk escalation engine module 302, although it may include other modules, databases, or applications, for example. As will be described below, the risk escalation engine module 302 is configured to process large numbers of borrower credit risk exposures in a near-real-time mode in order to monitor and assess credit risks in an automated, efficient, scalable, and reliable manner.

An exemplary process 300 for monitoring and assessing credit risks by utilizing the network environment of FIG. 2 is shown as being executed in FIG. 3. Specifically, a first client device 208(1) and a second client device 208(2) are illustrated as being in communication with REE device 202. In this regard, the first client device 208(1) and the second client device 208(2) may be "clients" of the REE device 202 and are described herein as such. Nevertheless, it is to be known and understood that the first client device 208(1) and/or the second client device 208(2) need not necessarily be "clients" of the REE device 202, or any entity described in association therewith herein. Any additional or alternative relationship may exist between either or both of the first client device 208(1) and the second client device 208(2) and the REE device 202, or no relationship may exist.

Further, REE device 202 is illustrated as being able to access a borrower requirements and data repository 206(1) and an escalation rules and analytics database 206(2). The risk escalation engine module 302 may be configured to access these databases for implementing a process for monitoring and assessing credit risks in a near-real-time mode.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the REE device 202 via broadband or cellular communication. Of course, these embodiments are merely exemplary and are not limiting or exhaustive.

Upon being started, the risk escalation engine module 302 executes a process for assessing a credit exposure risk. An exemplary process for assessing a credit exposure risk is generally indicated at flowchart 400 in FIG. 4.

Figure 4:
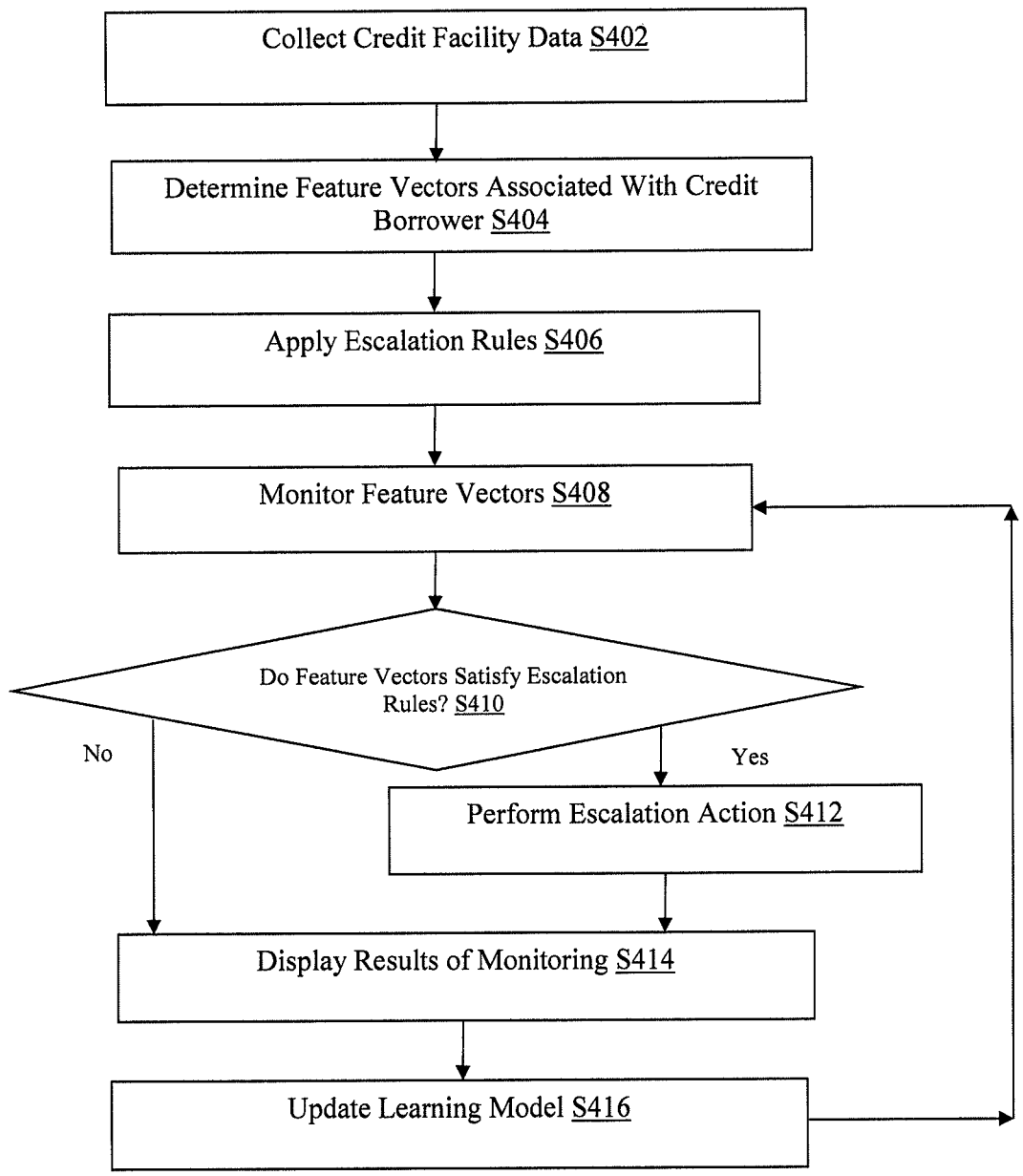
FIG. 4 is a flowchart of an exemplary method for monitoring credit exposure and assessing credit risk.

In the process 400 of FIG. 4, at step S402, the risk escalation engine module 302 collects credit facility data that is stored in one or more databases in the server devices 204. In an exemplary embodiment, the credit facility data includes at least one of credit overage data associated with a credit borrower device, financial loan data associated with the credit borrower device, data that relates to at least one financial transaction performed by the credit borrower device, and financial account data associated with the credit borrower device.

At step S404, the risk escalation engine module 302 determines at least one feature vector that is associated with a credit borrower device. In an exemplary embodiment, the determination of the feature vectors and the respective values thereof may performed by accessing data that is stored in the borrower requirements and data repository 206(1). In an exemplary embodiment, the feature vectors may include any one or more of a credit exposure maximum scaled vector, a credit size vector, a count credit occurrences vector, a credit last usage vector, a credit exposure vector, a credit usage vector, a maximum usage vector, a credit exposure scaled vector, a count of usage vector, a change from last usage vector, a change from start-of-day (SOD) usage vector, a current usage vector, a peak usage vector, an end-of-day (EOD) usage vector, a limit size vector, a peak line utilization vector, and a current line utilization vector.

In an exemplary embodiment, a credit exposure maximum scaled vector indicates a maximum amount of credit extended to a borrower associated with a particular credit borrower device. In an exemplary embodiment, a credit size vector (also referred to herein as a "limit size vector" indicates a dollar value of a credit limit). In an exemplary embodiment, a count credit occurrences vector indicates a number of times that a credit borrower device has exceeded its assigned credit limit. In an exemplary embodiment, a credit exposure vector indicates an average amount of credit that is extended to a credit borrower device. In an exemplary embodiment, a credit exposure scaled vector indicates an amount of credit that is extended to a credit borrower device.

In an exemplary embodiment, a count of usage vector indicates a count of unique periods within one data for which credit usage is greater than zero (0). In an exemplary embodiment, a change from last usage vector indicates a change in an amount of dollars of credit usage since a most recent message. In an exemplary embodiment, a change from SOD usage vector indicates a change in an amount of dollars of credit usage since the start of the day. In an exemplary embodiment, a current usage vector indicates a dollar value of current credit usage. In an exemplary embodiment, a peak usage vector indicates dollar value of peak credit usage by day. In an exemplary embodiment, an EOD usage vector indicates a dollar value of credit usage at the end of the day.

In an exemplary embodiment, a limit size vector indicates a dollar value of a credit limit. In an exemplary embodiment, a peak line utilization vector indicates a peak credit usage for a particular day divided by the credit limit, and is expressible as a percentage between 0% and 100%. In an exemplary embodiment, a currently line utilization vector indicates a current credit usage divided by the credit limit, and is expressible as a percentage between 0% and 100%.

At step S406, the risk escalation engine module 302 applies one or more escalation rules to the feature vectors. In an exemplary embodiment, the respective escalation rules may be accessed from the escalation rules and analytics database 206(2). In an exemplary embodiment, the escalation rules may be understood as a predefined set of gauges that provide an ability to quickly determine when credit exposure deviates from historical norms, any sharp changes in credit exposure, and meaningful concentrations across facilities, clients, sectors, and regions. In particular, the escalation rules may include the setting of threshold values for one or more feature vectors, such that when a feature vector does not exceed the respective threshold value, the escalation rule has not been satisfied, and no escalation action is required. By contrast, when a feature vector exceeds the respective threshold, the escalation rule has been satisfied, and a corresponding escalation action may then ensue.

At step S408, the risk escalation engine module 302 monitors the feature vectors over a predetermined time period. In an exemplary embodiment, a primary objective of the process 400 is to detect and manage credit exposure and risk in near real time based on intraday credit usage analytics, and therefore, the predetermined time period may be 24 hours, i.e., one day. However, the predetermined time period may be set to a different time period, e.g., one hour, two days, one week, one month, or any other desired time period.

In an exemplary embodiment, the monitoring of the feature vectors may be performed continuously throughout the predetermined time period. Alternatively, the monitoring of the feature vectors may be performed periodically at a regular interval within the predetermined time period. For example, if the predetermined time period is 24 hours, the feature vectors may be monitored every ten seconds, every 60 seconds (i.e., every minute), every ten minutes, every 60 minutes (i.e, every hour), or at any other desired interval.

At step S410, the risk escalation engine module 302 determines whether the feature vectors satisfy the escalation rules. In an exemplary embodiment, the determination as to whether the feature vectors satisfy the escalation rules may be performed by accessing analytics data stored in the escalation rules and analytics database 206(2). When the escalation rules have been satisfied (i.e., "Yes" at step S410), then at step S412, the risk escalation engine module 302 performs an escalation action. In an exemplary embodiment, the escalation action may include any one or more of suspending a financial account associated with the credit borrower device, sending a notification or an alert to the credit borrower device, and providing a recommendation to reduce a credit line associated with the credit borrower device.

Figure 5:
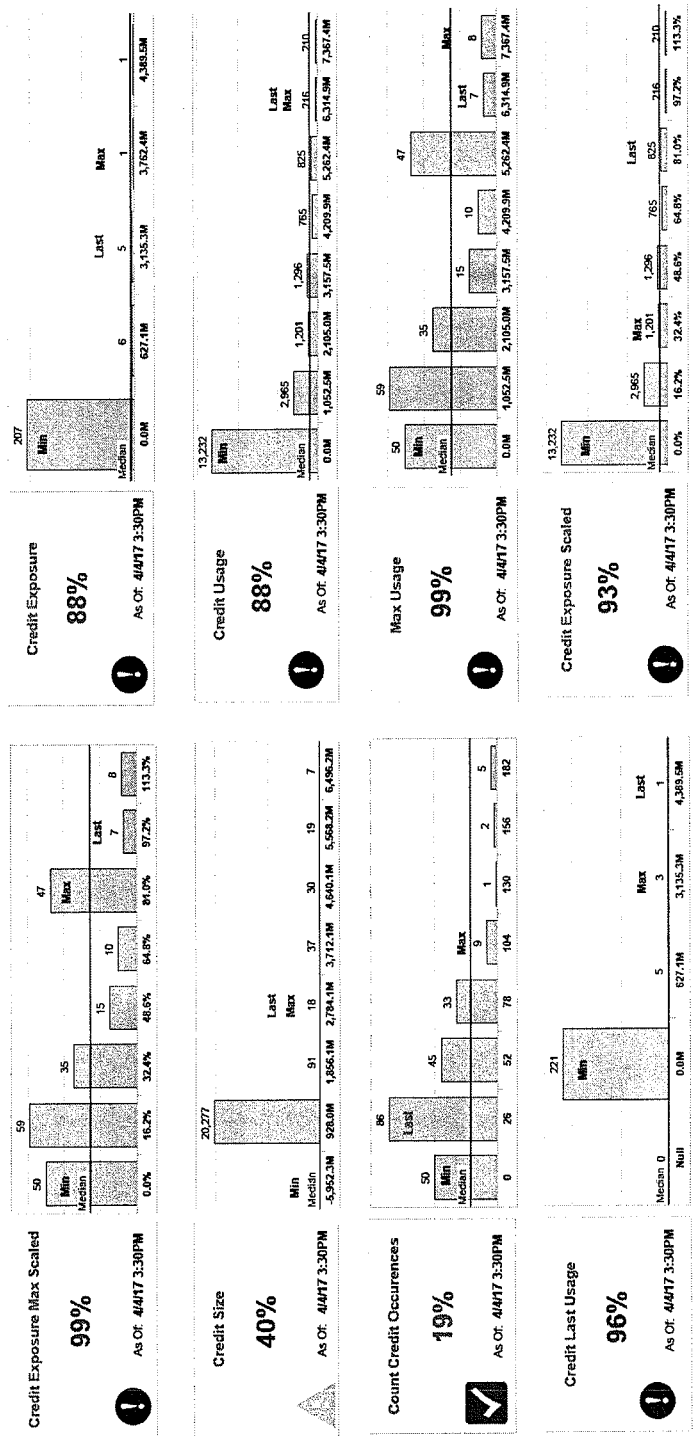
FIG. 5 illustrates a screen shot that appears on a display of a system for monitoring credit exposure and assessing credit risk, according to an exemplary embodiment.

When the escalation rules have not been satisfied (i.e., "No" at step S410), or when the escalation action has been performed at step S412, then at step S414, the risk escalation engine module 302 displays the results of the monitoring of the feature vectors. Referring also to FIG. 5, in an exemplary embodiment, an example of a screen shot of time series and histogram data for several feature vectors is illustrated. In the example illustrated in FIG. 5, the feature vector data is displayed on a computer display screen, such as, for example, an Intraday Facility Monitor (IFM), and for each feature vector, the data includes a feature vector identifier (i.e., name), a date and time of the data, and an indication regarding whether the feature vector is determined as having satisfied a respective escalation action. The indication may include, for example: 1) a check mark (√) in a green box that indicates that the escalation rule for that feature vector has not been satisfied, and therefore, that no escalation action is required; 2) an exclamation point (!) in a yellow box that indicates that the escalation rule for that feature vector has been satisfied, and that an escalation action corresponding to caution is suggested; and 3) an exclamation point (!) in a red circle that indicates that the escalation rule for that feature vector has been satisfied, and that an escalation action corresponding to a relatively strong response is appropriate.

In another exemplary embodiment, the results of the monitoring may be displayed in other formats, such as, for example, by using a color-coded gauge for each feature vector that includes a green section corresponding to a safe range in which no escalation action is required, a yellow section corresponding to a caution range in which an alert notification is suggested, and a red section corresponding to a danger range in which an account suspension or other definitive action is indicated. The gauge may include a needle that points to the gauge section that corresponds to the value of the feature vector.

In yet another exemplary embodiment, the results of the monitoring may be displayed as a color-coded table that illustrates a grade assigned to a feature vector value based on a probability of default, as determined by historical data and results. Alternatively, the results of the monitoring may be displayed in any desired format.

At step S416, the risk escalation engine module 302 updates a learning model. In an exemplary embodiment, the learning model includes a linear logistics regression mode learning algorithm that is stored in the escalation rules and analytics database 206(2). By updating the algorithm based on current data, the escalation rules may be adjusted to become more accurate and precise for subsequent situations. Then, the process 400 returns to step S410 in order to continue the monitoring of the feature vectors, and the process 400 continues until the predetermined time period for monitoring has expired.

Accordingly, with this technology, an optimized process for detecting and managing credit risk is provided. The optimized process enables a user to efficiently and automatically monitor intraday credit exposure and usage in near real time.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for assessing credit exposure risks, the method being implemented by a processor on a computing device, the method comprising:
    collecting credit facility data from a plurality of credit lender server devices;
    determining, based on the credit facility data, a plurality of feature vectors that are associated with a plurality of credit borrower devices;
    displaying at least one from among time series data and histogram data that relates to the plurality of feature vectors;
    applying at least one escalation rule to the plurality of feature vectors;
    continuously monitoring the plurality of feature vectors;
    determining which of the plurality of feature vectors satisfy the applied at least one escalation rule;
    displaying each of the plurality of feature vectors;
    indicating which of the plurality of feature vectors satisfy the applied at least one escalation rule;

when the plurality of feature vectors are determined as satisfying the applied at least one escalation rule, performing an escalation action with respect to one or more entities associated with one or more of the plurality of credit borrower devices; and adjusting the at least one escalation rule based on a learning model that includes a linear logistics regression mode learning algorithm that is updated based on a result of the continuously monitoring the plurality of feature vectors.

2. The method of claim 1, wherein the plurality of feature vectors include at least one of a credit exposure maximum scaled vector, a credit size vector, a count credit occurrences vector, a credit last usage vector, a credit exposure vector, a credit usage vector, a maximum usage vector, a credit exposure scaled vector, a count of usage vector, a change from start-of-day (SOD) usage vector, an end-of-day (EOD) usage vector, a peak line utilization vector, and a current line utilization vector.

3. The method of claim 1, wherein the escalation action includes at least one of suspending a financial account associated with the credit borrower device, sending a notification to the credit borrower device, and providing a recommendation to reduce a credit line associated with the credit borrower device.

4. The method of claim 1, wherein the credit facility data includes at least one of credit overage data associated with the credit borrower device, financial loan data associated with the credit borrower device, data that relates to at least one financial transaction performed by the credit borrower device, and financial account data associated with the credit borrower device.

5. The method of claim 1, wherein the continuously monitoring the plurality of feature vectors comprises continuously monitoring the determined at least one feature vector for a predetermined time period, and wherein the processor is a risk escalation engine.

6. The method of claim 1, wherein the linear logistics regression mode learning algorithm update is performed periodically at a regular interval during the continuously monitoring the determined at least one feature vector.

7. The method of claim 6, wherein the regular interval is one from among ten seconds, 60 seconds, ten minutes, and 60 minutes.

8. A system for assessing credit exposure risks, the system comprising:
a processor;
a memory; and
a communication interface coupled to each of the processor, the memory, and a display screen,
wherein the processor is configured to:
collect credit facility data from a plurality of credit lender server devices;
determine, based on the credit facility data, a plurality of feature vectors that are associated with at least one credit borrower device;
display, on the display screen, at least one from among time series data and histogram data that relates to the plurality of feature vectors;
apply at least one escalation rule to the plurality of feature vectors;
continuously monitor the plurality of feature vectors;
determine which of the plurality of feature vectors satisfy the applied at least one escalation rule;
display, on the display screen, each of the plurality of feature vectors;
indicate, on the display screen, which of the plurality of feature vectors satisfy the applied at least one escalation rule;
when the plurality of feature vectors are determined as satisfying the applied at least one escalation rule, perform an escalation action with respect to one or more entities associated with one or more of the plurality of credit borrower devices; and
adjust the at least one escalation rule based on a learning model that includes a linear logistics regression mode learning algorithm that is updated based on a result of the continuously monitor the plurality of feature vectors.

9. The system of claim 8, wherein the plurality of feature vectors include at least one of a credit exposure maximum scaled vector, a credit size vector, a count credit occurrences vector, a credit last usage vector, a credit exposure vector, a credit usage vector, a maximum usage vector, a credit exposure scaled vector, a count of usage vector, a change from start-of-day (SOD) usage vector, an end-of-day (EOD) usage vector, a peak line utilization vector, and a current line utilization vector.

10. The system of claim 8, wherein the escalation action includes at least one of suspending a financial account associated with the credit borrower device, sending a notification to the credit borrower device, and providing a recommendation to reduce a credit line associated with the credit borrower device.

11. The system of claim 8, wherein the credit facility data includes at least one of credit overage data associated with the credit borrower device, financial loan data associated with the credit borrower device, data that relates to at least one financial transaction performed by the credit borrower device, and financial account data associated with the credit borrower device.

12. The system of claim 8, wherein the processor is further configured to continuously monitor the plurality of feature vectors by continuously monitoring the determined at least one feature vector for a predetermined time period, and wherein the processor is a risk escalation engine.

13. The system of claim 8, wherein the linear logistics regression mode learning algorithm update is performed periodically at a regular interval during the continuously monitor the determined at least one feature vector.

14. The system of claim 13, wherein the regular interval is one from among ten seconds, 60 seconds, ten minutes, and 60 minutes.

* * * * *